United States Patent [19]

Mezger et al.

[11] 4,326,486

[45] Apr. 27, 1982

[54] APPARATUS FOR GENERATING AN IGNITION CONTROL SIGNAL FOR AN INTERNAL COMBUSTION ENGINE

[75] Inventors: Manfred Mezger, Markgröningen; Reinhard Leussink, Vaihingen; Adolf Fritz, Stuttgart, all of Fed. Rep. of Germany

[73] Assignee: Robert Bosch GmbH, Stuttgart, Fed. Rep. of Germany

[21] Appl. No.: 81,622

[22] Filed: Oct. 4, 1979

[30] Foreign Application Priority Data

Oct. 18, 1978 [DE] Fed. Rep. of Germany ....... 2845284

[51] Int. Cl.³ ............................................. F02P 5/08
[52] U.S. Cl. .................................... 123/418; 123/416
[58] Field of Search ......................... 123/414, 416, 418

[56] References Cited

U.S. PATENT DOCUMENTS 3,830,207 8/1974 Joseph ................................. 123/416
3,874,351 4/1975 Adler et al. .......................... 123/418

FOREIGN PATENT DOCUMENTS 588638 6/1977 Switzerland ....................... 123/418

*Primary Examiner*—Charles J. Myhre
*Assistant Examiner*—Andrew M. Dolinar
*Attorney, Agent, or Firm*—Frishauf, Holtz, Goodman & Woodward

[57] ABSTRACT

In order to control the spark advance of an internal combustion engine in the idling domain, the invention provides circuitry for increasing the spark advance below an upper rpm limit and returning the ignition timing to normal when the engine speed drops below a second lower limit. The continuous temporal shift of an output signal which may be used for engaging the ignition control system of the engine is provided by a very small number of elements, in particular only two timing elements, a flip-flop and a number of logical gates. The two flip-flops are triggered by the respective leading and trailing edges of the engine speed transducer signal. One of the flip-flops defines the upper engine speed limit while the second timing element defines the lower engine speed limit. Two embodiments of the invention are described.

5 Claims, 5 Drawing Figures

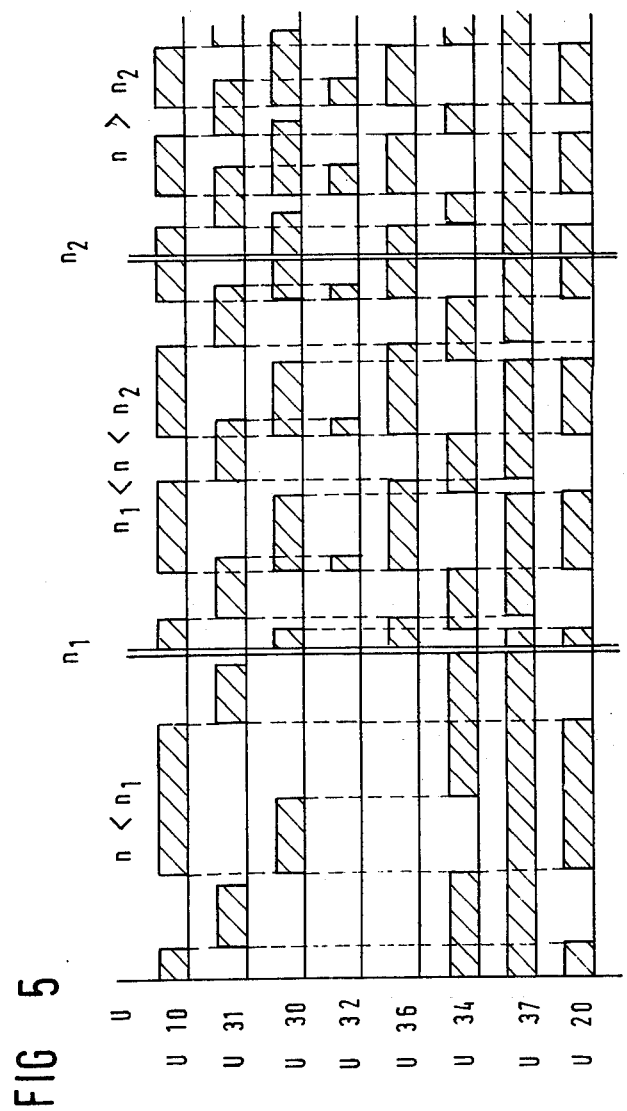

APPARATUS FOR GENERATING AN IGNITION CONTROL SIGNAL FOR AN INTERNAL COMBUSTION ENGINE

FIELD OF THE INVENTION

The invention relates to the ignition timing control of an internal combustion engine. More particularly, the invention relates to an apparatus for altering or overriding the spark advance feature in when the internal combustion engine is idling.

BACKGROUND

In ignition control systems known in the prior art, the ignition timing is advanced in the idling domain of the engine by an amount which increases when the engine speed drops. The shift takes place between two engine speed values both of which lie substantially in the idling range of the engine. The control signal for this shift is provided by a rotating transducer assembly. In one such apparatus, described in the German Patent Disclosure Document DE-OS 2 807 499, to which U.S. application Ser. No. 12 802, filed Feb. 16, 1979 corresponds, now abandoned, the spark advance is used to stabilize the engine operation in the idling domain, in particular if the engine is suddenly subjected to additional loads, for example by an electrical load switched on due to the use of, for example, air conditioning, etc. When the engine speed drops due to the additional load, the spark advance counteracts this tendency and results in overall stabilized operation. Inasmuch as the degree of spark advance is limited, the advance must be defeated and the engine timing returned to normal when the engine speed drops below a given lower rpm. This lower speed is preferably chosen to lie below the lowest normally occuring engine speed. It is a disadvantage of this apparatus as well as the other known systems of the prior art that they are cumbersome and expensive and thus not really suitable for use as input circuits in ignition timing systems. This is particularly the case when these inputs circuits are to be integrated with the transducer assembly.

THE INVENTION

It is thus one of the principal objects of the present invention to provide an ignition control system which performs a spark advance in a given idling range of the engine and which uses only elementary circuit components connected in a very simple circuit. In particular, the apparatus of the invention comprises as circuit elements only two timing elements, one flip-flop and a number of logical gates.

In one preferred embodiment of the invention, a flip-flop is triggered by the clock signal from the transducer assembly and the duty cycle of the transducer signal is retained for all engine speed regions.

In a second embodiment of the invention, all connections are static and the circuit is thus capable of hybridization and is immune to external disturbances.

Further features and advantages of the invention will emerge from the following description of two exemplary embodiments which are related to the drawing.

THE DRAWING

FIG. 5 is a timing diagram illustrating the operation of the apparatus of FIG. 4.

DESCRIPTION OF THE PREFERRED EMBODIMENTS

Figure 1:
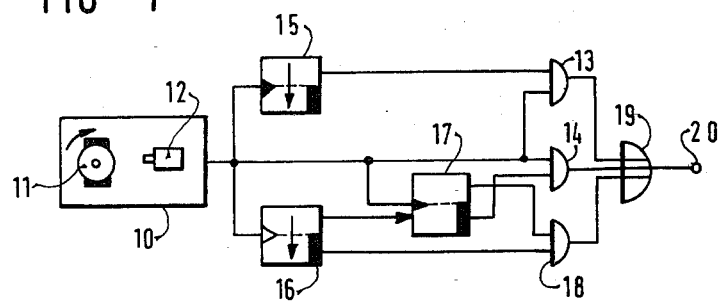
FIG. 1 is a block circuit diagram of a first embodiment of the invention.
Figure 2:
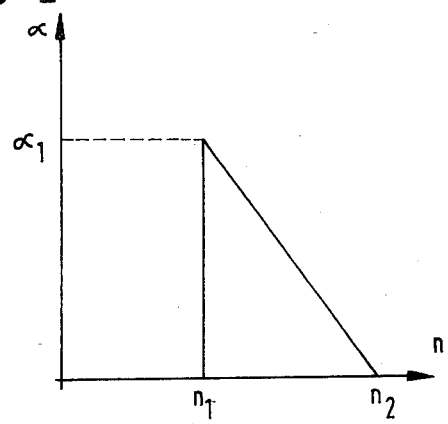
FIG. 2 is a diagram illustrating the spark advance angle as a function of engine speed.

In the first embodiment of the invention, illustrated in FIG. 1, there is shown a transducer assembly 10 which generates a speed (rpm) dependent signal. It includes a rotor 11 attached to a rotating member of the engine, for example the crankshaft. The rotor 11 has two markers (intended for use with a four-cylinder engine) whose passage is detected by a sensor 12 which may operate on the basis of optical, inductive or magnetic phenomena, for example on the basis of the Hall effect or the Wiegand effect. If a Wiegand sensor is used which generates only very narrow pulses, a flip-flop must be employed to use two consecutive pulses to generate a continuous signal of angular duration.

The output of the transducer assembly 10 is coupled into one input of each of two AND gates 13, 14 as well as to one input of each of two timing elements 15, 16. The transducer signal is also connected to the clock input of a flip-flop 17 which is preferably embodied as a D-typeflip-flop. One output of the timing element 15 is connected to the second input of the AND gate 13. The first output of the timing element 16 is connected to the control input of the flip-flop 17 while the second, complementary output of the timing element 16 is connected to one input of an AND gate 18. The first output of the flip-flop 17 is connected to the second input of the AND gate 18 while the second, complementary output of the flip-flop 17 is connected to a further input of the AND gate 14. The outputs of the three AND gates 13, 14, 18 are connected to respective inputs of an OR gate 19 whose own output is a terminal 20. The signal generated on the terminal 20 can be used directly to actuate the output stage of an ignition system or may be applied to driver or amplifier stages which actuate an ignition closure control and/or ignition angle control or open-loop regulation. An ignition angle control system is described, for example, in the Germn Disclosure Document DE OS 2 701 968 to which U.S. Pat. No. 4 174 696 corresponds while an open-loop ignition angle control system is described in the German Disclosure Document DE OS 2 655 948 to which U.S. Pat. No. 4,174,688 corresponds. If the apparatus according to the invention is used in association with an additional angle control system, the latter generates an ignition angle operating curve on the basis of the characteristics of the engine and the apparatus of the invention then performs an additional spark advance in the idling domain of the engine.

The function and operation of the first embodiment of the invention illustrated in FIG. 1 is to advance the occurrence or onset of the spark by an angle α which increases with decreasing engine speed "n" beginning with an upper threshold n2 of approximately 1000 rpm. Once the engine speed drops below a lower limit n1 of, for example 700 rpm, the ignition angle α is returned to its original value which may be different from zero. The lower limiting speed n1 is a value which lies below any normally occurring idling speeds of the engine.

Figure 3:
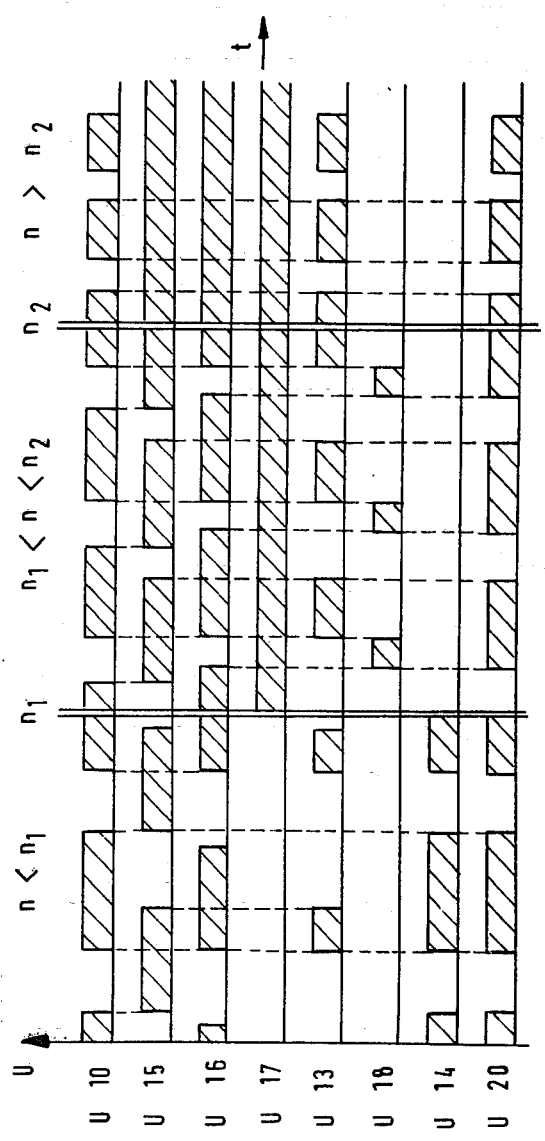
FIG. 3 is a timing diagram to illustrate the operation of the apparatus of FIG. 1.

The function of the circuit illustrated in FIG. 1 is diagrammed in the timing diagram of FIG. 3. The diagram of FIG. 3 is divided into three portions, the left third of the diagram being devoted to engine speeds below n1, the central portion being devoted to engine speeds between n1 and n2 and the right part of the diagram describing events at speeds above n2.

The first timing element 15 is triggered by each rear edge of the transducer signal U10. The time constant of the element 15 is so chosen that above an engine speed n2, the timing element is retriggered before its time constant has expired. Accordingly, the output of the timing element 15 is a steady logical 1 above the engine speed n2. The signals U15 and U10 are connected AND gate 13 which generates signal U13.

The second timing element 16 is triggered by a rising edge of the transducer signal 10 but has the same time constant as the element 15 so its output also exhibits a steady logical 1 above the engine speed n2. Inasmuch as the signals U16 are shorter than the signals U10 when the engine speed lies below n1, and the flip-flop 17 is triggered by a rear edge of the signal U10, the control input of the flip-flop 17 sees a logical 0 signal below the engine speed n1 at the instant of triggering so that the output of the flip-flop 17 and thus the associated input of the AND gate 18 has a steady logical 0 signal below the engine speed n1. Accordingly, the output signal of the AND gate 18 is also a logical 0 in this engine speed domain. The steady 1-signal generated by the complementary output of the flip-flop 17 causes the control signals U10 to be transmitted through the AND gate 14 to the output terminal 20. In the engine speed domain below n1, the signals U13 have no effect on the output control signals U20.

In the middle engine speed region, i.e., between the speeds n1 and n2, the signals U16 become of longer duration than the signals U10 so that the output of the flip-flop 17 is a steady logical 1. Accordingly, the complementary output signals $\overline{U16}$ of the timing element 16 are transformed into signals U18 which are switched through to the output terminal 20. The AND gate 14 is blocked in this engine speed domain by a 0 signal from the complementary output of the flip-flop 17. The signals U13 and U18 are conjoined, i.e., summed in time, to generate the output control signal train U20 which is seen to be shifted in the direction of advance by an amount of time equal to the duration of a signal U18 with respect to the transducer signal U10. The duty cycle of the signal train U20 is the same as that of the signal train U10.

In the engine speed domain above the value n2, the AND gate 14 remains blocked. The AND gate 18 is also blocked because the complementary output signal $\overline{U16}$ of the timing element 16 is a logical 0 in this engine speed domain. The output signal U15 of the timing element 15 is also a steady logical 1 so that the control signals U10 are transmitted by the AND gate 13 to the output contact 20.

The duty cycle of the output control signal train U20 is thus the same as that of the input signal train U10 in all three engine speed domains. However, in the central speed domain, i.e., between the speeds n1 and n2, the output signal U20 is shifted continuously in the direction of an advance with respect to the input signal U10 and by an amount equal to the duration of the signal u18. The amount of advance varies continuously between angles of 0° and $\alpha$ 1° when the speed varies between n1 and n2.

The signals U17, U15, U16 and U10 are conjoined by the gates 13, 14, 18, 19 according to the logical formula:

(U15 AND U10) OR ($\overline{U17}$ AND U10) OR (U17 AND $\overline{U16}$).

Figure 4:
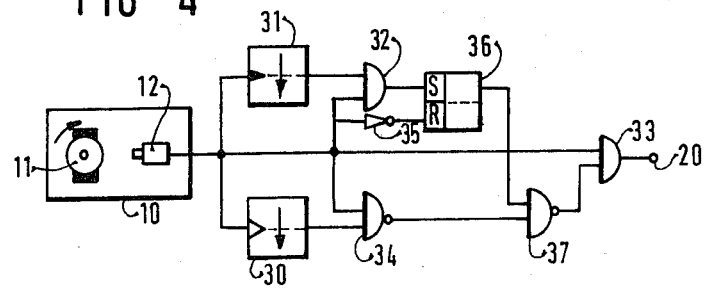
FIG. 4 is a block circuit diagram of a second embodiment of the invention.

A second exemplary embodiment of the invention is illustrated schematically in FIG. 4. The composition of the transducer assembly 10 may be identical to that of FIG. 1 and will not be further described. The output signal U10 is coupled to one input of each of two timing elements 30, 31 as well as to one input of each of two AND gates 32, 33, one input of a NAND gate 34 and through an inverter 35 to the reset input R of an RS-flip-flop 36. The output of the timing element 31 is connected via the AND gate 32 to the set input S of the flip-flop 36 whose own output is connected through a NAND gate 37 with a further input of the AND gate 33. The output of the timing element 30 is connected through the NAND gate 34 to a further input of the NAND gate 37. The output contact 20 is defined by the output of the AND gate 33.

The operation of the second embodiment of the invention according to FIG. 4 is illustrated in the timing diagram of FIG. 5 which is subdivided into the three engine speed regions previously described for the diagram of FIG. 3. A rear edge of the transducer signal 10 triggers the timing element 31. The resulting output signal U31 is conjoined with the transducer signal U10 in the AND gate 32 whose output signal train U32 constitutes the set-signals for the flip-flop 36. The time constant of the timing element 31 is so chosen that when the engine speed is equal to n1, the time constant is just equal to the time between signals U10. Thus the signals U10 and U31 do not coincide below the engine speed n1 and the output of the AND gate 32 and the flip-flop 36 is a steady logical 0 in this engine speed domain. For this reason, the output of the NAND gate 37 is a steady logical 1 and the transducer signals U10 are thus passed through the AND gate 33 to the output contact 20.

In the intermediate speed domain, i.e., between n1 and n2, the overlapping signals U32 set the flip-flop 36 which is reset by the inverter signals $\overline{U10}$. The output signals U36 of the flip-flop 36 thus correspond to the signals U10. The same is true for engine speeds above n2. The output signal U30 of the timing element 30 which is triggered by the rising edge of the signal U10 is conjoined with the transducer signals U10 in the NAND gate 34. The signal train U34 resulting therefrom is conjoined with the output signals U36 in the NAND gate 37. The resulting signals U37 are then conjoined in AND gate 33 to form the output signals control train U20. The conjunction of the transducer signal U10 and the output signal U30 from the timing element 30 together with the output signal U36 of the flip-flop 36 takes place according to the following logical formula:

(U10 AND U30) OR $\overline{U36}$ AND U10

It will be appreciated to the person skilled in the art that logical formulas shown above are subject to transformation according to the known rules of Boolean algebra so that different logical circuit elements may be used with suitable inversion of the input signals to retain the overall logical function of the circuit.

We claimed:

1. Apparatus for generating an ignition control signal having
   a rotating engine speed transducer assembly (10) for supplying a pulse-type engine speed signal of substantially constant angular duration, and having two edges;
   and circuit means for shifting the time of occurrence of one of the pulse edges of said engine speed signal, which controls ignition, in the direction of spark advance with decreasing engine speed, within two discrete engine speed limits ($n_1$, $n_2$) both of which lie substantially within the range of engine idling, and which define therebetween a lower speed ($n_1$) and an upper speed ($n_2$) of said range
   and wherein, according to the invention, said circuit means for shifting the engine speed signal comprises
   first and second timing means (15, 16; 30, 31) each having a triggering input connected to said engine speed transducer assembly (10);
   a flip-flop (17, 36) connected to and receiving an output signal from said second timing means (16, 31) as an input signal;
   and gate means (13, 14, 18, 19, 33, 34, 37) connected to and receiving output signals from at least one of said first and second timing means, said engine speed transducer assembly and from said flip-flop, said first and second timing means, being connected, respectively, to be triggered by respectively different succeeding pulse edges of the engine speed signal (U10) to provide timing output signals of respective time duration, said timing output signals being connected to said gate means to compare the duration of said timing output signals of the second timing means with the time duration between two sequential unlike first pulse edges of said engine speed signal, the equality of said comparison indicating the lower of said discrete engine speed limits, and to compare the duration of the output signal of said first timing means with the time duration between two predetermined pulse edges of said engine speed signal,
   the equality of said comparison indicating the upper of said discrete engine speed limits;
   said gate means combining the respective timing output signals of said first and second timing means, and said engine speed signal to that the pulse edges of the output signals produced by one of the timing means at the termination of its timing output signals form a time shifted pulse edges of the engine speed signal upon occurrence of non-equality of said comparison between said discrete engine speed limits for controlling ignition.

2. Apparatus according to claim 1 wherein said flip-flop (17) has a clock input and a control input;
   the clock input of said flip-flop being connected to the engine speed transducer signal and the control input being connected to the output of said second timing means (16).

3. Apparatus according to claim 1 wherein the gate means combine output signals U17 from said flip-flop (17) and output signals U15, U16 of said first and second timing means (15, 16) and the engine speed signal U10 from said engine speed transducer assembly (10) according to the relationship:

(U15 AND U10) OR ($\overline{U17}$ AND U10) OR (U17 AND $\overline{U16}$).

4. An apparatus according to claim 1 wherein said flip-flop (36) is a static flip-flop having first and second switching states, said first switching state being defined by overlap of the output signals from said first timing means (31) and said engine speed signal and said second switching state being defined by said engine speed signal.

5. An apparatus according to claim 4, wherein the output signal (U36) of said flip-flop (36), the output signal (U30) of said first timing means (30) and said engine speed signals (U10) are conjoined by said gate means according to the relation:

((U10 AND U30) OR U36) AND U10

* * * * *